US009124666B2

(12) United States Patent
Burman et al.

(10) Patent No.: US 9,124,666 B2
(45) Date of Patent: Sep. 1, 2015

(54) RELIABILITY AND AVAILABILITY OF DISTRIBUTED SERVERS

(71) Applicant: Riverbed Technology, Inc., San Francisco, CA (US)

(72) Inventors: Daniel Edwin Burman, Flower Mound, TX (US); Kartik Subbanna, Fremont, CA (US); Steven McCanne, Berkeley, CA (US); David Tze-Si Wu, Fremont, CA (US); MArk Stuart Day, Milton, MA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 39 days.

(21) Appl. No.: 13/725,926

(22) Filed: Dec. 21, 2012

(65) Prior Publication Data
US 2014/0019519 A1   Jan. 16, 2014

Related U.S. Application Data

(63) Continuation of application No. 11/243,068, filed on Oct. 3, 2005, now Pat. No. 8,364,815.

(60) Provisional application No. 60/663,174, filed on Mar. 18, 2005.

(51) Int. Cl.
G06F 15/173 (2006.01)
H04L 29/06 (2006.01)
H04L 29/08 (2006.01)

(52) U.S. Cl.
CPC ............ *H04L 67/42* (2013.01); *H04L 67/2814* (2013.01); *H04L 67/2842* (2013.01); *H04L 67/2876* (2013.01)

(58) Field of Classification Search
None
See application file for complete search history.

(56) References Cited

U.S. PATENT DOCUMENTS 4,988,998 A   1/1991   O'Brien
5,414,850 A   5/1995   Whiting
(Continued)

FOREIGN PATENT DOCUMENTS

EP   0 813 326 A2   12/1997
EP   1 056 279 A1   9/2001
(Continued)

OTHER PUBLICATIONS

"Unleashing the True Power of Today's Networks", A Peribit White Paper, Aug. 2002, pp. 1-13, URL=http://www.peribit.com/products/etc/0217w02punl.htm.
(Continued)

*Primary Examiner* — Afshawn Towfighi
(74) *Attorney, Agent, or Firm* — Park, Vaughan, Fleming & Dowler LLP

(57) ABSTRACT

A system of network proxies distributes data to multiple servers. Each network proxy is associated with a server. A network proxy intercepts a client request for data. If the network proxy determines that the request can be served using a copy of data stored on the local server, rather than the data stored on a remote server, it diverts the request to the local server. If the network proxy determines that the request cannot be served using a data from the local server, the network proxy diverts the request to a remote server storing the primary copy of the data. A server map specifies the locations of the primary copies of data. When a primary copy of data is updated on one of the servers, the associated network proxy propagates the updated data to the other servers. The servers can provide data from files, e-mail services, databases, or multimedia services.

25 Claims, 7 Drawing Sheets

(56) References Cited

U.S. PATENT DOCUMENTS

| | | | |
|---|---|---|---|
| 5,737,594 A | 4/1998 | Williams | |
| 5,754,774 A | 5/1998 | Bittinger et al. | |
| 5,771,355 A | 6/1998 | Kuzma | |
| 5,822,746 A | 10/1998 | Williams | |
| 5,838,963 A | 11/1998 | Griffiths | |
| 5,903,723 A | 5/1999 | Beck et al. | |
| 5,977,890 A | 11/1999 | Rigoutsos et al. | |
| 5,990,810 A | 11/1999 | Williams | |
| 5,999,949 A | 12/1999 | Crandall | |
| 6,009,462 A | 12/1999 | Birrell et al. | |
| 6,076,084 A | 6/2000 | Harlan | |
| 6,138,162 A | 10/2000 | Pistriotto et al. | |
| 6,163,811 A | 12/2000 | Porter | |
| 6,178,461 B1 | 1/2001 | Chan et al. | |
| 6,212,565 B1 | 4/2001 | Gupta et al. | |
| 6,219,642 B1 | 4/2001 | Asghar et al. | |
| 6,233,253 B1 | 5/2001 | Settle et al. | |
| 6,369,723 B1 | 4/2002 | Pieterse et al. | |
| 6,397,253 B1 | 5/2002 | Quinlan et al. | |
| 6,415,323 B1 | 7/2002 | McCanne et al. | |
| 6,415,329 B1 | 7/2002 | Gelman et al. | |
| 6,449,658 B1 | 9/2002 | Lafe et al. | |
| 6,473,406 B1 | 10/2002 | Coile et al. | |
| 6,487,538 B1 | 11/2002 | Gupta et al. | |
| 6,513,061 B1 | 1/2003 | Ebata et al. | |
| 6,553,141 B1 | 4/2003 | Huffman | |
| 6,563,517 B1 | 5/2003 | Bhagwat et al. | |
| 6,578,054 B1* | 6/2003 | Hopmann et al. | 707/625 |
| 6,598,081 B1 | 7/2003 | Coile et al. | |
| 6,642,860 B2 | 11/2003 | Meulenbroeks | |
| 6,667,700 B1 | 12/2003 | McCanne et al. | |
| 6,678,828 B1 | 1/2004 | Zhang et al. | |
| 6,704,730 B2 | 3/2004 | Moulton et al. | |
| 6,721,780 B1 | 4/2004 | Kasriel et al. | |
| 6,757,733 B2 | 6/2004 | Gupta | |
| 6,772,193 B1 | 8/2004 | Igawa et al. | |
| 6,789,255 B1 | 9/2004 | Pedrizetti et al. | |
| 6,822,955 B1 | 11/2004 | Brothers et al. | |
| 6,839,682 B1 | 1/2005 | Blume et al. | |
| 6,874,017 B1 | 3/2005 | Inoue et al. | |
| 6,894,981 B1 | 5/2005 | Coile et al. | |
| 6,912,645 B2 | 6/2005 | Dorward et al. | |
| 6,940,835 B2 | 9/2005 | Reza et al. | |
| 6,973,485 B2 | 12/2005 | Ebata et al. | |
| 6,981,029 B1 | 12/2005 | Menditto et al. | |
| 7,047,485 B1 | 5/2006 | Klein et al. | |
| 7,065,619 B1 | 6/2006 | Zhu et al. | |
| 7,120,666 B2 | 10/2006 | McCanne et al. | |
| 7,123,613 B1 | 10/2006 | Chawla et al. | |
| 7,161,947 B1 | 1/2007 | Desai | |
| 7,224,839 B2 | 5/2007 | Zeineh | |
| 7,316,028 B2 | 1/2008 | Donatelli et al. | |
| 2001/0051927 A1 | 12/2001 | London et al. | |
| 2002/0029326 A1 | 3/2002 | Reuter et al. | |
| 2002/0032787 A1* | 3/2002 | Overton et al. | 709/230 |
| 2002/0038371 A1 | 3/2002 | Spacey | |
| 2002/0062384 A1 | 5/2002 | Tso | |
| 2002/0087547 A1 | 7/2002 | Kausik et al. | |
| 2002/0091801 A1 | 7/2002 | Lewin et al. | |
| 2002/0138511 A1 | 9/2002 | Psounis et al. | |
| 2002/0147895 A1 | 10/2002 | Glance et al. | |
| 2002/0156911 A1 | 10/2002 | Croman et al. | |
| 2002/0157019 A1 | 10/2002 | Kadyk et al. | |
| 2002/0194382 A1 | 12/2002 | Kausik et al. | |
| 2003/0043844 A1 | 3/2003 | Heller | |
| 2003/0055826 A1 | 3/2003 | Graham | |
| 2003/0115488 A1 | 6/2003 | Kunito et al. | |
| 2003/0163646 A1 | 8/2003 | O'Neil | |
| 2004/0088376 A1 | 5/2004 | McCanne et al. | |
| 2004/0186861 A1 | 9/2004 | Phatak | |
| 2004/0215746 A1 | 10/2004 | McCanne et al. | |
| 2004/0243703 A1 | 12/2004 | Demmer et al. | |
| 2005/0044242 A1 | 2/2005 | Stevens et al. | |
| 2005/0125553 A1 | 6/2005 | Wu et al. | |
| 2006/0069719 A1 | 3/2006 | McCanne et al. | |
| 2006/0212524 A1 | 9/2006 | Wu et al. | |
| 2006/0212935 A1 | 9/2006 | Burman et al. | |
| 2006/0248194 A1 | 11/2006 | Ly et al. | |

FOREIGN PATENT DOCUMENTS

| | | |
|---|---|---|
| JP | 2002-359649 A | 12/2002 |
| JP | 2004/254039 | 9/2004 |
| JP | 2004/348495 A | 12/2004 |
| WO | 95/20793 A | 8/1995 |
| WO | 98/16067 A2 | 4/1998 |
| WO | 00/13100 A1 | 3/2000 |
| WO | 01/63420 A1 | 8/2001 |
| WO | 01/65831 A2 | 9/2001 |
| WO | 01/80022 A1 | 10/2001 |
| WO | 01/97526 A1 | 12/2001 |
| WO | 02/054699 A1 | 7/2002 |

OTHER PUBLICATIONS

Amer, A., et al., "File Access Prediction with Adjustable Accuracy", Institute of Electrical Engineers, Proceedings of the 2002 IEEE International; Performance, Computing and Communications Conference, Phoenix, AZ, Apr. 3-5, 2002, vol. Conf. 21, pp. 131-140.

Annapureddy, Siddhartha et al., "Shark: Scaling File Servers via Cooperative Caching," 2005, *Proceedings of the 2nd Conference on Symposium on Networked Systems Design and Implementation*, vol. 2, pp. 129-142.

Black, David et al., "pNFS Block/Volume Layout," Aug. 30, 2006, NFSv4 Working Group: Internet Draft, EMC Corporation, pp. 1-18. httQ://www.ietf.org/inernet-drafts/draft-ietf-nfsv4-Qnfs-block-01. txt.

Bungum, O. W., "Transmultiplexing, Transcontrol and Transscrambling of MPEG-2/DVB Signal", International Broadcasting Convention, London, Great Britain, Sep. 12-16, 1996, pp. 288-293.

Caceres, R., et al., "Web Proxy Caching: The Devil is in the Details", Jun. 1998, Proceedings of the Workshop on Internet Server Performance, Madison, Wisconsin, pp. 111-118.

Chakrabarti, Samidy, "Low-Bandwidth Web Access with Tandem Proxies", Sep. 2002, Department of Electrical Engineering, Massachusetts Institute of Technology, pp. 1-64.

Cox, Landon P. et al., "Pastiche: Making Backup Cheap and Easy," Dec. 9-11, 2002, *Proceedings of the 5th Symposium on Operating Systems Design and Implementation*, USENIX Association, Boston, Massachusetts, 14 pages.

Dabek, Frank M. et al., Wide-area cooperative storage with CFS, 2001, *ACM SIGOPS Operation Systems Review*, vol. 35, Issue 5, pp. 202-215.

Deshpande, M., et al., "Selective Markov Models for Predicting Web-Page Accesses", May 2004, *ACM Transactions on Internet Technology*, vol. 4, Issue 2, pp. 163-184.

Eaton, Patrick et al., "Efficiently Binding Data to Owners in Distributed Content-Addressable Storage Systems," 2005, *Proceedings of the Third IEEE International Security in Storage Workshop*, pp. 40-51.

Eaton, Patrick et al., "Improving Bandwidth Efficiency of Peer-to-Peer Storage," Aug. 2004, *Proceedings of the Fourth International Conference on Peer-to-Peer Computing*, pp. 80-90.

Ernst, Michael et al., "dCache, a distributed storage data caching system," Sep. 2001, *Proceedings of Computing in High Energy Physics*, Beijing, People's Republic of China.

European Office Action received Jul. 19, 2010 in related European Application No. 05736807.8.

Factor, Michael et al., "Compression in the Presence of Shared Data," International Journal of Computing and Information Sciences, Jun. 2001, pp. 29-41, vol. 135, Issue 1-2.

Factor, Michael et al., "Software Compression in the client/server environment" Proceedings DCC 2001. Data Compression Conference IEEE Comput. Soc Los Alamitos, CA USA, 2001, pp. 233-242, XP002564773 ISBN: 0-7695-1031-0.

Fan, Li. et al., "Summary Cache: A Scalable Wide-Area Web Cache Sharing Protocol", 1998, *IEEE/ACM Transactions on Networking*, vol. 8, No. 3, pp. 281-293.

(56) References Cited

OTHER PUBLICATIONS

Feldmeier, D. C. et al., "Protocol Boosters," IEEE JSAC, Apr. 1998, vol. 16, Issue 3, pp. 437-444.
Franaszek, Peter, et al., "Parallel Compression with Cooperative Dictionary Construction", Proceedings of Data Compression Conference, DCC '96, Mar. 31-Apr. 3, 1996, pp. 200-209.
Fuhrmann, Patrick, "dCache the commodity cache," 2004, *Twelfth NASA Goddard and First IEEE Conference on Mass Storage Systems and Technologies*, Washington D.C.
Griffioen, James et al., "Automatic Prefetching in a WAN," Oct. 1993, *Proceedings of the IEEE Workshop on Advances in Parallel and Distributed Systems*, Technical Report # CS243-93, pp. 8-12.
Griffioen, James et al., "Reducing File System Latency using a Predictive Approach," Jun. 1994, *Proceedings of the USENIX*, Summer 1994 Technical Conference on USENIX, Technical Conference vol. 1.
Halevy, B. et al., "Object-Based pNFS Operations," Aug. 29, 2006, NFSv4 Working Group: Internet Draft; EMC Corporation, pp. 1-23. http://www.ietf.org/inernet-drafts/draft-ietf-nfsv4-Qnfs-block-02.txt.
Hildebrana, Dean et al., "pNFS and Linux: Working Towards a Heterogeneous Future," May 10, 2006, CITI Technical Report Jun. 2006, *Center for Information Technology Integration*, University of Michigan, Ann Arbor, Michigan.
Housel, B. C. et al., "Emulator Express: A System for Optimizing Emulator Performance for Wireless Networks," *IBM Systems Journal*, 2000, pp. 384-402, vol. 39, Issue 2.
International Search Report and Written Opinion dated Dec. 12, 2007 for PCT application No. PCT/US2006/010006 (8 pages).
Kahol et al., "A Strategy to Manage Cache Consistency in a Disconnected Distributed Network," IEEE. Transactions on Parallel and Distributed Systems, Jul. 2001, pp. 686-700, vol. 12, Issue 7, IEEE Computer Society. Los Alamitos, California, USA.
Knutsson, Bjorn et al., "Transparent Proxy Signaling," 1999, *Department of Information Technology; Department of Computer Systems*, Journal of Communications and Networks, vol. 3, No. 3, University of Uppsala, Uppsala, Sweden, pp. 164-174.
Kubiatowicz, John et al., "OceanStore: An Architecture for Global-Scale Persistent Storage," Nov. 2000, *Proceedings of the Ninth International Conference on Architectural Support for Programming Languages and Operating Systems* (ASPLOS 2000), pp. 190-201.
Kulkarni, P. et al., "Redundancy Elimination Within Large Collections of Files," Jun. 27-Jul. 2, 2004, *Proceedings of the General Track: 2004 US EN IX Annual Technical Conference*, University of Massachusetts, Boston, Massachusetts, 14 pages.
Lei, Hui et al., "An Analytical Approach to File Prefetching," Jan. 1997, *Proceedings of the Annual Conference on USENIX Annual Technical Conference*, Anaheim, California, pp. 1-12.
Lin, K. et al., "Code compression techniques using operand field remapping", Computers and Digital Techniques, IEEE Proceedings, vol. 149, Issue 1, Jan. 2002, pp. 25-31.
Manber, Udi et al., "A Text Compression Scheme that Allows Fast Searching Directly in the Compressed File", Mar. 1993, Department of Computer Science, University of Arizona, Technical Report #93-07, pp. 1-13.
Manber, Udi et al., "Finding Similar Files in a Large File System", Department of Computer Science, Oct. 1993, pp. 1-10, Technical Report #93-33, University of Arizona, Tucson, Arizona.
Manber, Udi et al., "Glimpse: A Tool to Search Through Entire File Systems", Department of Computer Science University of Arizona, TR 93-34, Oct. 1993.
Mellia, M. et al., "TCP Smart-Framing: Using Smart Segments to Enhance the Performance of TCP", Global Telecommunications Conference, GLOBECOM '01. IEEE, vol. 3, Nov. 25-29, 2001, pp. 1708-1712.
Muthitacharoen, A. et al., "Ivy: A Read/Write Peer-To-Peer File System," 2002, *ACM SIGOPS Operating System Review*, vol. 36, No. SI, pp. 31-44.
Muthitacharoen, Athicha et al., "A Low Bandwidth Network File System," 2001, Proceedings of the 18th ACM Symposium on Operating System Principles (SOSP'01), Oct. 21-24, 2001, pp. 174-187.
Oly, James et al., "Markov Model Prediction of I/O Request for Scientific Applications", Jun. 2002, *Proceedings of the 16th International Conference on Supercomputing*, pp. 147-155.
Padmanabhan et al., "Using Predictive Prefetching to Improve World Wide Web Latency", ACM SIGCOMM Computer Communication Review, Jul. 1999, pp. 22-36, vol. 26, No. 3.
Rhea, Sean C. et al., "Value-Based Web Caching", May 20-24, 2003, *Proceedings of the 12th International Conference on World Wide Web*, Budapest, Hungary, pp. 619-628.
Rhea, Sean C. et al., "Pond: the Ocean Store Prototype," Jan. 2003, Proceedings of the 2nd US EN IX 0 Conference on File and Storage Technologies, pp. 1-14.
Sayood, Khalid et al., "Recursively Indexed Quantization of Memoryless Sources", Sep. 1992, IEEE Transactions on Information Theory, vol. 38, No. 5, pp. 1602-1609.
Spring, Neil T. et al., "A Protocol-Independent Technique for Eliminating Redundant Network Traffic," 2000, Proceedings of ACM SIGCOMM, Computer Communication Review, Oct. 2000, vol. 30, Issue 4, pp. 87-95.
Tolia, Niraj et al., "Integrating Portable and Distributed Storage," Mar. 2004, *Proceedings of the 3rd USENIX Conference on File and Storage Technologies (FAST'04)*, San Francisco, California, pp. 227-238.
Tolia, Niraj, et al., "An Architecture for Internet Data Transfer", May 2006, Proceedings of the 3rd Symposium on Networked Systems Design and Implementation (NSDI'06), San Jose, California.
Tolia, Niraj, et al., "Opportunistic Use of Content Addressable Storage for Distributed File Systems," Jun. 2003, *Proceedings of the 2003 USENIX Annual Technical Conference*, pp. 127-140.
White, J., "Supply Chain Responsiveness", BRITVIC Soft Drinks, Carrow, Norvich, (Feb. 23, 1998), XP006506548.
Yang, Qiang et al., "Mining Web Logs for Prediction Models in WWW Caching and Prefetching", *Proceedings of the Seventh ACM SIGKDD International Conference on Knowledge Discovery and Data Mining KDD'01*, Aug. 26-29, 2001, San Francisco, California, pp. 473-478.
Zhu, Benjamin et al., "Avoiding the Disk Bottleneck in the Data Domain Deduplication File System," 2008, *Proceedings of the 6th USENIX Conference on File and Storage Technologies*, pp. 269-282.

\* cited by examiner

RELIABILITY AND AVAILABILITY OF DISTRIBUTED SERVERS

CROSS-REFERENCES TO RELATED APPLICATIONS

This application is a continuation of U.S. patent application Ser. No. 11/243,068, filed Oct. 3, 2005, (now U.S. Pat. No. 8,364,815, issued Jan. 29, 2013), entitled "Reliability and Availability of Distributed Servers," which claims priority from and is a nonprovisional application of U.S. Provisional Patent Application No. 60/663,173, filed Mar. 18, 2005, entitled "Improved Reliability and Availability of Distributed File Servers."

This application is related to and incorporates by reference for all purposes U.S. patent application Ser. No. 10/285,315, filed Oct. 30, 2002, (now U.S. Pat. No. 7,120,666, issued Oct. 10, 2006), entitled "Transaction Accelerator for Client-Server Communication Systems," (hereinafter "McCanne I"), U.S. patent application Ser. No. 10/640,405, Aug. 12, 2003 (now U.S. Pat. No. 8,069,225, issued Nov. 29, 2011), entitled "Transparent Client-Server Transaction Accelerator," (hereinafter "McCanne III"), U.S. patent application Ser. No. 10/640,562, Aug. 12, 2003 (now U.S. Pat. No. 7,318,100, issued Jan. 8, 2008), entitled "Cooperative Proxy Auto-Discovery and Connection Interception," (hereinafter "McCanne IV"), and U.S. patent application Ser. No. 10/640,459, Aug. 12, 2003 (now U.S. Pat. No. 7,650,416, issued Jan. 19, 2010), entitled "Content Delivery for Client-Server Protocols with User Affinities using Connection End-Point Proxies," (hereinafter "McCanne V").

BACKGROUND OF THE INVENTION

The present invention relates generally to improving availability of information and resources despite network impairments of networks or servers. Many organizations have multiple offices or locations, and multiple projects active simultaneously. Collections of servers interconnected by data networks allow distributed organizations to support multiple distinct but cooperating locations, sharing their project information via these servers. In a networked file system, for example, files used by applications in one location might be stored in another location. Similar problems exist for other kinds of servers and services, such as e-mail, computation, multimedia, video conferencing, database querying, and office collaboration, in which the servers may be handling data such as web pages, text, database tables, images, video, audio, dynamic computations, applications, and services.

In a multi-location organization, a common arrangement is for each project to be assigned to a single location. However, such an assignment does not mean that the project is worked on only by people in that location. Rather, some persons working in other locations are also expected to contribute to that project. Typically, this arrangement is implemented by maintaining a file server at each location. Each location's file server contains the files related to every project assigned to that location. In general, any file or group of files can have a logical "home" in a single location, meaning that the file or group of files is stored at that location's file server. In addition, it is common to have a system such as Microsoft DFS, which enables a mapping from a logical name for a group of files to a server or group of servers storing that group of files. Additionally, file sharing systems enable users at a given location to access files stored by file servers at other locations.

With ideal, well-behaved communication networks and file servers, users at each location can contribute to the organization's work on any project. Each user can access their local file server or a file server at a remote location at any time, to read, write, or update files. In this ideal arrangement, there only needs to be a single copy of each file that is read or written by the various users sharing information via that file. The current state of each file is completely and accurately represented by the information in the single file copy.

Unfortunately, the real communication networks interconnecting locations are often less reliable, more expensive, and/or have less bandwidth than the local-area networks connecting users to their local file servers. In addition, the reliability and availability of each location's file server may vary greatly. For example, some locations may have unreliable power or network connections. Another example is that in an organization that is globally distributed, downtime required for preventive maintenance in the local time zone may correspond to prime working hours in a remote location. These network and server problems are referred to generally as network impairments. During network impairments, users may continue to have access to data stored on their local file server, but remote users will have no access to this data.

One approach to overcoming network impairments is to replicate data on file servers at different locations. The replicated data may include multiple copies of files, groups of files, or parts of files. This data replication offers the opportunity for access to the replicated data at multiple locations despite network impairments. There have been many proposed systems for replicating data. However, all of these approaches have significant limitations and are often complicated to configure, to manage, and to use.

File caching systems can be used to replicate data from remote file servers. However, file caching systems often require modifications to work with existing applications and servers. A naming system, such as Microsoft DFS, can introduce a level of indirection that avoids requiring modification of clients or servers. Unfortunately, configuration of naming systems for such purposes is complicated and error-prone. Additionally, the failure of the naming system is an additional cause of network impairments.

Traditionally, some file caching systems do not allow for modification of replicated data. Instead, all modifications must be done to a single "master" version of the data. This ensures that the replicated data is consistent. Other file caching systems allow for modification of local copies of data, rather than a master copy, by introducing complex file leasing and locking controls. Examples of such systems are Cisco Systems WAFS and Tacit Networks IShared. In such systems, a user "leases" access to a copy of the data for a limited period. During this period, the user can modify this copy of the data without restriction. During the lease period, all other copies of the data on other file servers are "locked," so that no other users can modify their copies of the data. Once the user's lease expires, the other copies of the data are updated to reflect any changes made by the user. The downsides with these systems include the added complexity and overhead of managing the leases and locks on data and the need to modify servers and applications to handle locked files properly. Additionally, network impairments can interfere with accessing and/or modifying data. Sometimes systems allow multiple copies of data to be modified simultaneously, especially in the presence of network impairments; however, such an arrangement leads to additional complexity and potential errors when the network impairment ends and multiple differing copies of nominally-identical data must be reconciled.

Another approach to improving access to data is using pre-positioning content distribution systems, such as the service provided by Akamai or the Cisco ECDN or ACNS products. These systems allow the files to be moved out to multiple edge servers where they can be served efficiently. These systems also support forms of redirection based on DNS or HTTP so as to spread requests to multiple servers and tolerate a variety of server and network failures. However, these systems typically allow only read access to the replicated data and cannot support any kind of modification to the files that are distributed. Thus, they are unsuitable for collaboration applications in which multiple users create, read, and modify data.

The problems of network impairments on data sharing arrangements is exacerbated by the tendency to move many file servers to a small number of data centers. This reduces the cost and complexity of managing the file servers, but increases the system's vulnerability to network impairments.

It is therefore desirable to have a data distribution system and method that replicates data efficiently and allows data to be accessed during network impairments with minimal disruption to users. It is further desirable that the system be simple to configure and manage. It is also desirable for the system to integrate with applications and servers without requiring modifications.

BRIEF SUMMARY OF THE INVENTION

An embodiment of the invention comprises a client-side server that coordinates with other servers via network proxies that may provide various kinds of transaction acceleration. Multiple copies of this arrangement in conjunction with various forms of redirection and failover allow improved access to servers despite network impairments.

In an embodiment, a client-side server is associated with a client-side network proxy. In addition, a relationship is established between the client-side server and one or more other servers, where the relationship is controlled via the client-side network proxy and one or more server-side network proxies. As a result, there are three new potential paths for traffic between clients and servers to the existing client-server path through the network proxies. First, a request from a client may be directed to a client-side server, which then delivers a response to the client. Second, a client-side server may communicate changes or other information to a related server elsewhere. Third, a related server elsewhere may communicate changes or other information to a client-side server.

In an embodiment, each client-side server includes a copy of data stored by other remote servers. The client-side network proxy may intercept client requests for data. If the client-side network proxy determines that the request can be served using a copy of data stored by client-side server, rather than the date stored on a remote server, it diverts the request to the client-side server. In an alternative embodiment, the client may send its requests directly to the client-side server. In a further embodiment, modifications to data are processed by the server storing the master copy of the data. These changes are then propagated to the copies of the data stored at the client-side server and any other servers, potentially leveraging the capabilities of the network proxies to improve the performance of such propagation.

BRIEF DESCRIPTION OF THE DRAWINGS

The invention will be described with reference to the drawings, in which.

In the drawings, the use of like reference numbers indicates similar components.

DETAILED DESCRIPTION OF INVENTION

An embodiment of the invention includes a client-side server that coordinates with other servers via network proxies that may provide various kinds of transaction acceleration. Multiple copies of this arrangement in conjunction with various forms of redirection and failover allow improved access to servers despite network impairments. The complexity of configuring, managing, and accessing replicated data can be hidden from the users by achieving the property of one-copy serializability, in which the presence of multiple copies and concurrent activity is not detectable by the users of the system: each user continues to see the system behave as though there were a single copy of each file, as in the first-described ideal system. In an alternate embodiment, the various unusual properties and behaviors can be exposed to users and their applications, as in the "relaxed consistency" models of a system like Bayou as described in the paper by D. Terry et al., "Managing Update Conflicts in Bayou, a Weakly Connected Replicated Storage System," Proceedings of the 15th ACM Symposium on Operating Systems Principles (SOSP-15), 1995. Although such models can provide additional flexibility, applications must understand the configuration of data so as to behave properly, which often requires extensive modifications.

As used herein, "client" generally refers to a computer, computing device, peripheral, electronics, or the like, that makes a request for data or an action, while "server" generally refers to a computer, computing device, peripheral, electronics, or the like, that operates in response to requests for data or action made by one or more clients. A request can be for operation of the computer, computing device, peripheral, electronics, or the like, and/or for an application being executed or controlled by the client. One example is a computer running a word processing program that needs a document stored externally to the computer and uses a network file system client to make a request over a network to a file server. Another example is a request for an action directed at a server that itself performs the action, such as a print server, a processing server, a control server, and equipment interface server, an I/O (input/output) server, etc.

Figure 1:
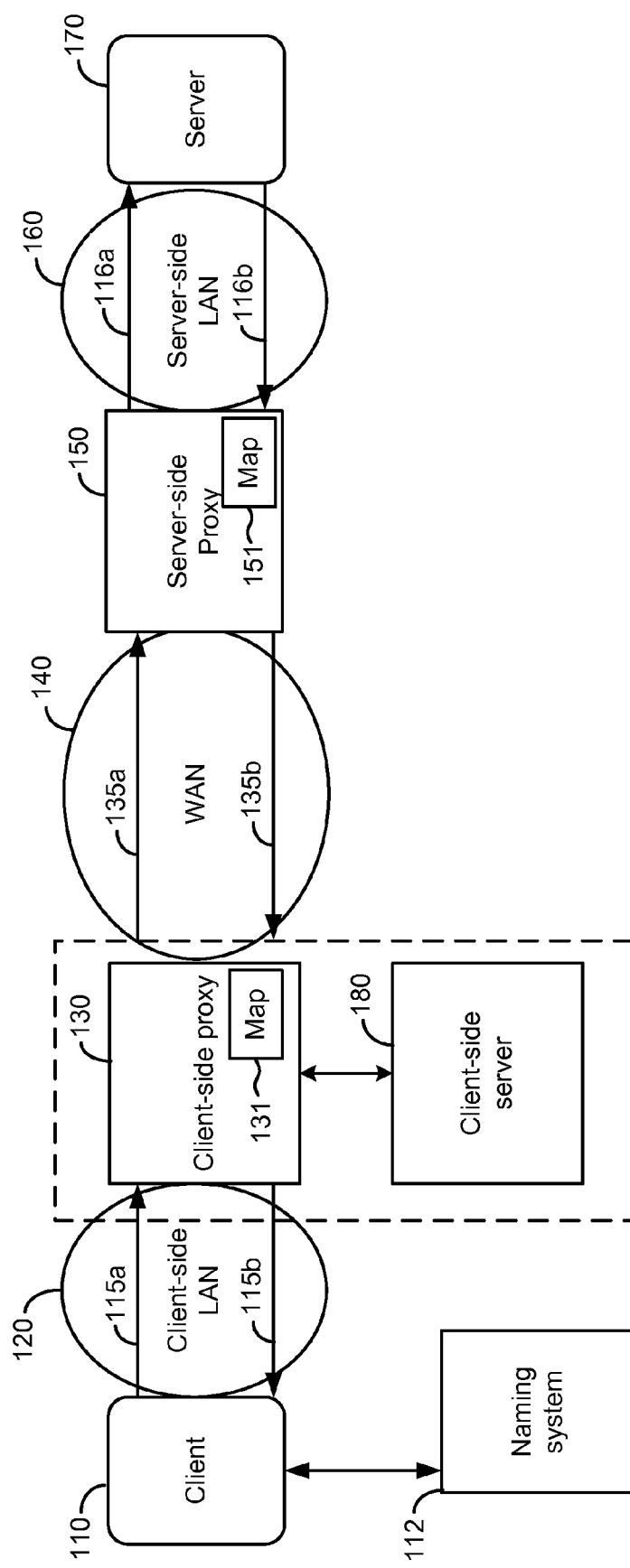
FIG. 1 shows an example network with a client, client-side server, origin server, and network proxies suitable for use with an embodiment of the invention.

FIG. 1 shows a system 100 for accelerated communication between client 110 and server 170. In the figure, client 110 and client-side network proxy 130 are both attached to a client-side network 120, typically a local-area network or LAN. Likewise, server 170 and server-side network proxy 150 are both attached to a server-side network 160. Client-side network 120 and server-side network 160 are both connected via WAN 140, possibly via additional routing, switching, or bridging devices and links not shown in FIG. 1. WAN 140 may comprise of a variety or networks or internets capable of carrying data messages, including virtual private networking protocols.

Network traffic 115a from client 110 may be sent via client-side network proxy 130, which in an embodiment may optimize or transform it into optimized traffic 135a before sending it to server-side network proxy 150 on the other side of wide-area network WAN 140. Server-side network proxy 150 is the counterpart to client-side network proxy 130 and in an embodiment applies reverse optimization or transformation to received optimized network traffic 135a before forwarding it as ordinary network traffic 116a to server 170. Traffic 116b from server 170 to client 110 travels the reverse path, in an embodiment becoming optimized traffic 135b and then being transformed to traffic 115b before reaching client 110.

In an embodiment, both client-side network proxy 130 and server-side network proxy 150 are connection-oriented: that is, traffic between client 110 and client-side proxy 130 is governed by the form of connections opened or closed between client 110 and client-side network proxy 130. A similar connection-oriented approach applies both for traffic between client-side network proxy 130 and server-side network proxy 150, and for traffic between server-side network proxy 150 and server 170. Other embodiments may handle network traffic between these elements only as individual messages or packets, but a connection-oriented approach has advantages of both robustness and higher performance in many practical situations.

Client-side server 180 is associated with client-side network proxy 130. The client-side server 180 may be implemented by the same device as the client-side network proxy 130, or the client-side server 180 may be implemented by a different device from that implementing the client-side network proxy 130, the two devices communicating via one or more private or shared networks, possibly including client-side network 120. Client-side network proxy 130 includes client-side server map 131, and server-side network proxy 150 includes server-side server map 151. Some requests 115a from a client 110 are served by the client-side server 180 rather than by the server 170. The requests 115a from client 110 may be sent through the client-side network proxy 130 to the client-side server 180, or the requests 115a may be sent directly to the client-side server 180, bypassing the client-side network In an embodiment, names for objects in the client-side server 180 are made known to the client 110 or to some external naming system 112 by which client 110 finds objects. In some embodiments, the external naming system 112 may be implemented by the client-side server 180 or by the client-side network proxy 130. The client 110 then contacts the client-side server 180 to retrieve named objects. In another embodiment, names for objects in the client-side server 180 are made known to some external naming system 112 by which client 110 finds objects. The client 110 then contacts the client-side server 180 via the information provided by the external naming system 112 to retrieve named objects.

In still another embodiment, client 110 attempts to send its request 115a to server 170, but client-side network proxy 130 determines with use of client-side server map 131 that the request 115a can be served at client-side server 180, and diverts the request 115a accordingly so that it is received by client-side server 180 rather than by the server 170. In a further embodiment, client 110 attempts to send its request 115a to server 170, but server-side network proxy 150 determines with use of server-side server map 151 that the request 115a can be served at client-side server 180, and diverts the request 115a accordingly so that it travels back across WAN 140 and is received by client-side server 180 rather than by server 170.

Figure 2A:
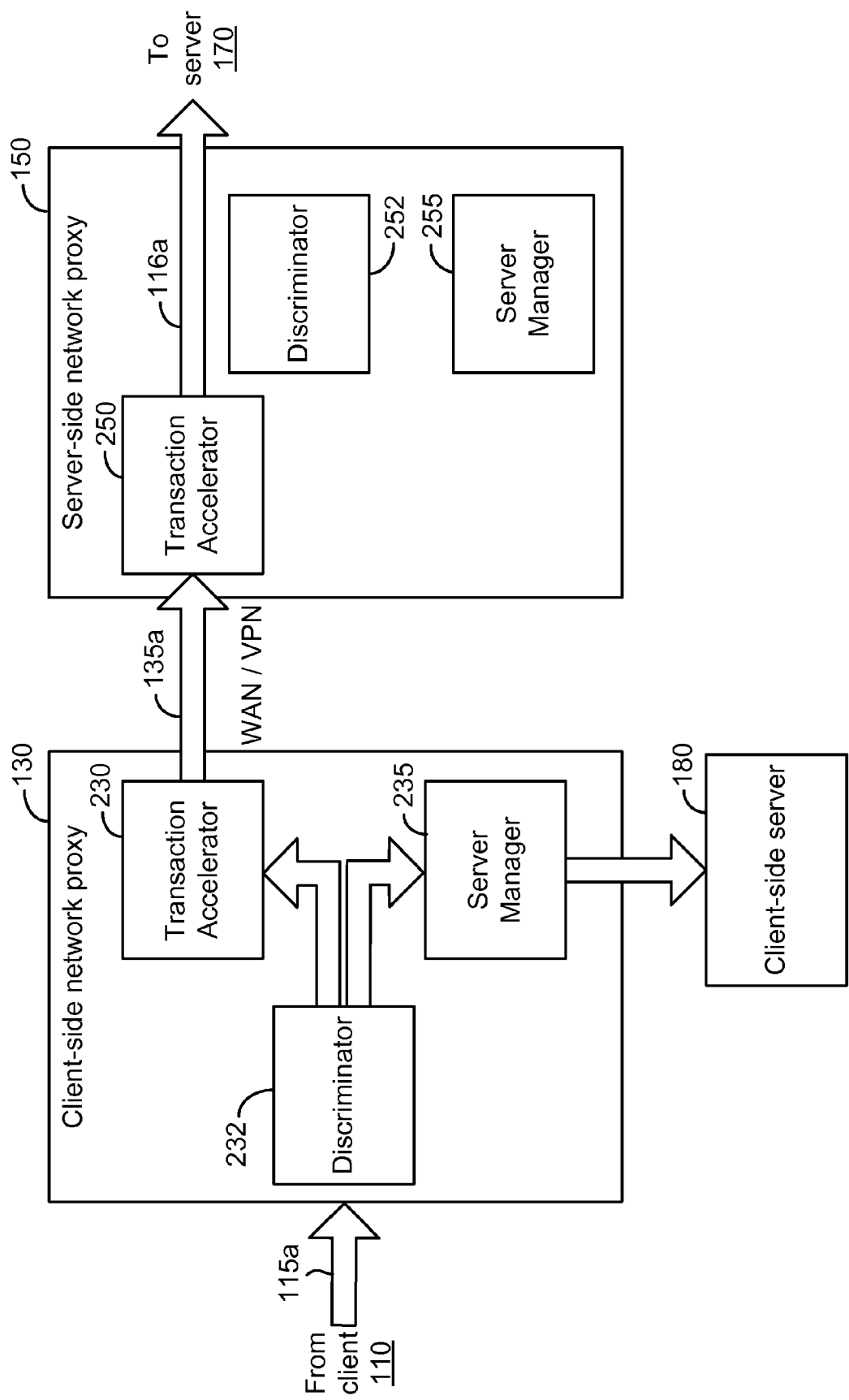
FIG. 2A shows the internal structure of the network proxy according to an embodiment of the invention.
Figure 2B:
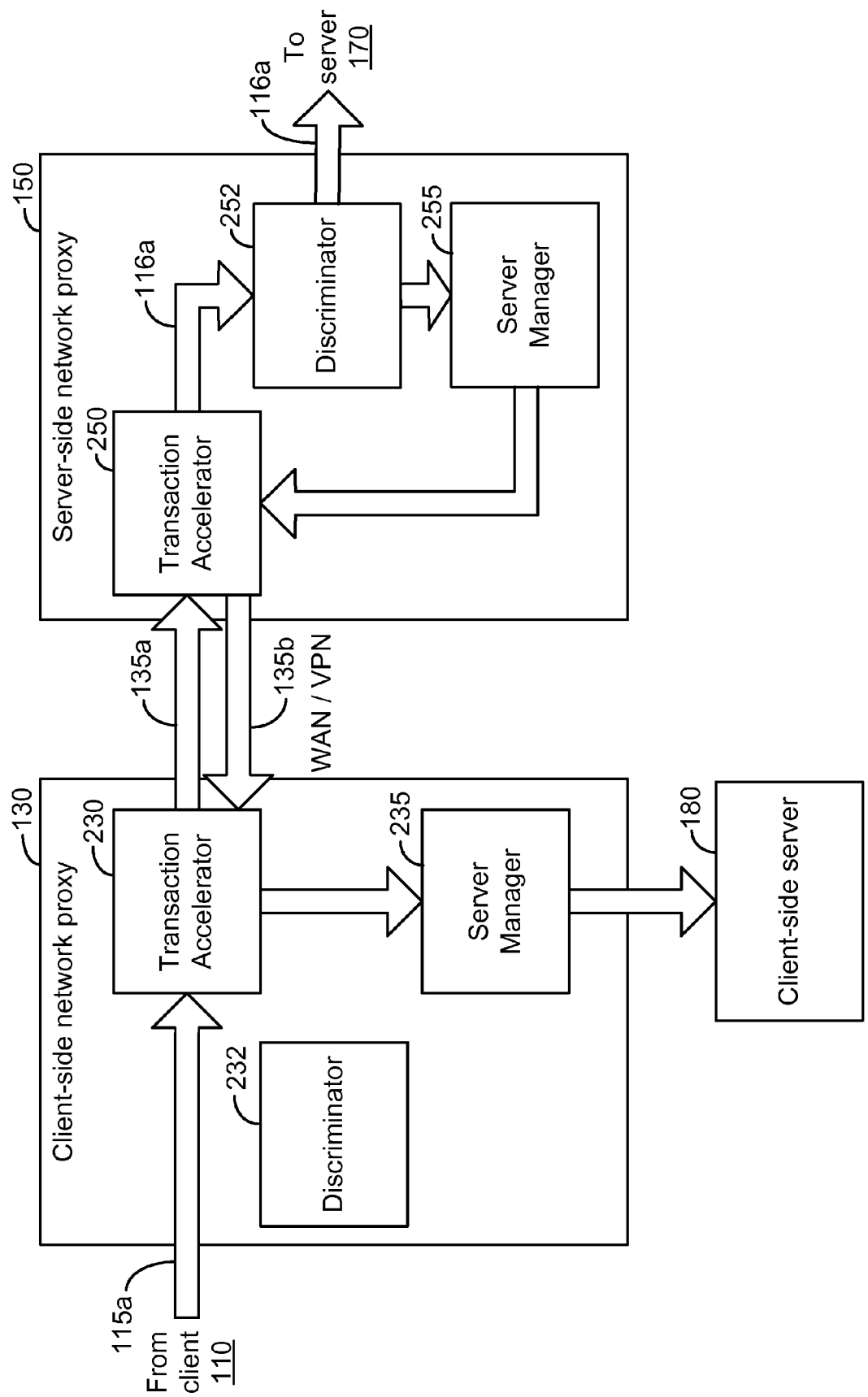
FIG. 2B shows a server-side discrimination path.

FIGS. 2A-B show embodiments of the internal structure of client-side network proxy 130 and server-side network proxy 150 and two potential flows of messages through them. The client-side network proxy contains a client-side transaction accelerator 230, client-side discriminator 232, and a client-side server manager 235, while the server-side network proxy 150 contains a server-side transaction accelerator 250, server-side discriminator 252, and a server-side server manager 255. Examples of the transaction accelerators 230 and 250 are described in detail in McCanne I and McCanne III, which are incorporated by reference herein.

FIGS. 2A and 2B show two different paths for requests to pass through network proxies 130, 150 and reach client-side server 180: a client-side discrimination path and a server-side discrimination path. These two different paths can be active simultaneously for different kinds of requests, but for clarity of exposition they are presented separately.

For each incoming request 115a that might be served by the client-side server 180, the client-side discriminator 232 examines the request 115a and decides whether to pass it on to the client-side accelerator 230 or to the client-side server manager 235. FIG. 2A shows a client-side discrimination path according to an embodiment of the invention.

In an embodiment, all requests are considered by the client-side discriminator 232, regardless of protocol or addressing. In another embodiment, only requests originating at specific IP addresses or ports are considered by the client-side discriminator 232. In another embodiment, only requests being sent to specific IP address or ports are considered by the client-side discriminator 232. In still another embodiment, only requests matching particular header templates are considered by the client-side discriminator 232. In some embodiments, requests 115a are sent directly to client-side server 180, which may include a client-side discriminator 232. In such an embodiment, client-side network proxy 130 is involved only for requests that are being passed to server 170 via transaction accelerators 230 and 250, or for state changes at client-side server 180 being propagated to server 170 via transaction accelerators 230 and 250.

FIG. 2B shows server-side discrimination path. For each incoming request 116a received from the server-side transaction accelerator 250 where the request 116a might be better served by the client-side server 180, the server-side discriminator 252 examines the request 116a and decides whether to pass it on to the server 170 or to the server-side server manager 255.

In one embodiment, all requests are considered by the server-side discriminator 252, regardless of protocol or addressing. In another embodiment, only requests originating at specific IP addresses or ports are considered by the server-side discriminator 252. In another embodiment, only requests being sent to specific IP address or ports are considered by the server-side discriminator 252. In still another embodiment, only requests matching particular header templates are considered by the server-side discriminator 252.

In one embodiment of the invention, a client-side file server is related through a pair of network proxies to a server-side file server, such as that shown in FIG. 1. The term "share" is used herein to refer to an entity that can contain a file or group of files. In an embodiment, each share on the client-side server may be identified at the client-side network proxy as either "local" or "broadcast", and may have a further mapping associated with it. The mapping identifies one or more related servers. "Local" means that the share may be written at the client-side network proxy, and any related server subsequently receives those changes. In contrast, "broadcast" means the share is only read at the client-side network proxy, and any related server is a source of changes.

The following examples will make use of the terminology "x is a local share of y" to mean that share x is marked as local and is related to share y so that changes at x are subsequently made at y. Correspondingly, "p is a broadcast share of q" means that share p is marked as broadcast and is related to share q so that changes at q are subsequently made at p.

In some example implementations, a correct global configuration identifies each share as "local" at zero or one of the total collection of client-side network proxies, but not at two or more. If there are zero (total) client-side network proxies with "local" file access, then all writes happen at the server-side file server only. If there is one (and only one) client-side network proxy with "local" file access, then all writes happen at that client-side network proxy. In either case, it is straightforward to maintain one-copy serializability despite network impairments. However, if there are two or more client-side network proxies with "local" file access, then there are many potential race conditions and network impairments that lead to inconsistent results for different users. Such misconfigurations can be detected automatically by the related server that is asked to accept changes from two or more servers claiming "local" access to the same share.

With a correct configuration, in the presence of a network impairment, shares that are marked as "local" are still fully usable at the client-side server via the client-side network proxy. In the same circumstances, shares that are marked as "broadcast" are still accessible at the client-side server via the client-side proxy, but may only be read.

In a more elaborate example implementation, consider a simple two-location configuration and a single data center. The example elaborates shares to be named, extensible, possibly-empty groups of files. A file share name comprises of a server name (marked by // at the beginning) and a hierarchical directory name (comprising of one or more elements starting with /). In systems not supporting hierarchical naming, similar effects can be achieved by generating new names; the hierarchy is used in examples only for convenience. The data center contains two shares, one corresponding to each location (for example, Boston and NewYork). The data center's server is named as //dc, so in this example, the shares for Boston and NewYork would be:

//dc/Boston
//dc/NewYork

These are the names used for data center administrative tasks such as backup. Users in each location deal with their local file shares, which are actually implemented by a client-side file server associated with the client-side network proxy. In this particular example, at the Boston client-side network proxy there would be a server called //Boston. Note that in this example, //Boston and //dc are both servers, while //dc/Boston is a share on the //dc server that happens to have a name similar to the //Boston server. The example will "connect up" these matching names, but there is no intrinsic connection.

Continuing with this example, there are two shares on the //Boston server:

//Boston/projects
//Boston/shadow/NewYork

The first share is the file share containing all of the files for projects assigned to Boston. The second share is the file share containing a read-only version of all the files for projects assigned to NewYork. These Boston shares are related to the dc shares in the following way:

//Boston/projects is a local share of //dc/Boston
//Boston/shadow/NewYork is a broadcast share of //dc/NewYork This example embodiment means that the Boston location can write to files in //Boston/projects and the changes will be automatically propagated to //dc/Boston/projects, from which they can be backed up to tape. Correspondingly, while no-one in Boston can write to //Boston/shadow/NewYork, they can examine it for the latest version of anything written to //dc/NewYork.

Next, this example establishes a corresponding set of relationships with the NewYork file server:

//NewYork/projects is a local share of //dc/NewYork
//NewYork/shadow/Boston is a broadcast share of //dc/Boston For this example, consider what happens while the network is up (i.e. there are no network impairments) and someone in NewYork is working on the //Boston/projects/example file. In this example situation, the NewYork user operates on the file using the name //Boston/projects/example. The New York user is accessing the file in the same location that a Boston user would: manipulating files local to the Boston location, on a server that is associated with the Boston client-side network proxy. From the New York user's perspective, the Boston client-side network proxy acts like a server-side proxy, and accordingly provides the same acceleration benefits.

In this example, each modification to the //Boston/projects/example file is automatically communicated back to the //dc/Boston/projects/example file, because //Boston/projects is a local share of //dc/Boston/projects. This property is true regardless of whether the change is caused by a user in the Boston location or in the New York location. Subsequently, each modification of the //dc/Boston/projects/example file is automatically communicated out to the //NewYork/shadow/Boston/projects/example file, because //NewYork/shadow/Boston is a broadcast share of //dc/Boston/projects. So each change on a file in Boston is automatically made shortly afterward to copies of the file in the data center and in New York.

In an embodiment, the communication of modifications (updates) may optionally take advantage of the transaction acceleration capabilities provided by the proxies in the system, such as that described in McCanne I and McCanne III, so as to improve the speed or the size of the updates crossing the network. Such usage of proxy capabilities may be enabled by default or disabled by default, and its subsequent disablement or enablement may take place on a per-share or per-file basis, and may be altered manually or automatically in real-time without affecting the mapping and relationships among the shares and files.

In this example, the automatic copying of changes means that a user in NewYork still has access to some information if they are no longer able to reach the server in Boston. In particular, the user in NewYork still has access to a read-only copy of the file under the name //NewYork/shadow/Boston/projects/example.

A further embodiment detects failures and remaps names. Continuing with the above example, assume that the New York user can access files via the new //LogicalBoston share, which ordinarily maps to //Boston. If //Boston is not reachable, the name //LogicalBoston can be remapped to //NewYork/shadow/Boston. This remapping can be automatic (based on failing to reach the //Boston server) or manual, initiated by a New York user when they notice that they are no longer able to work on Boston files. At a later point, when //Boston is reachable again, //LogicalBoston can be remapped again to //Boston. The detection of reachability for recovery can be driven by periodic tests from the client side (New York), by periodic tests from the server side (Boston), or both. As with the initial remapping, the recovery to the original configuration can be manual or automatic.

Even with automatic remapping, it is possible for a sequence of network impairments to produce configurations that violate one-copy serializability. However, these bad sequences are likely to be rare enough that an embodiment can handle these situations as special cases when they arise. In a further embodiment, sequence numbering of reachable groups can be used to ensure one-copy serializability. One example of such sequence numbering appears in a paper by B. Oki and B. Liskov titled "Viewstamped replication: A general primary copy method to support highly available distributed systems," published in Proceedings of the 7th Symposium on Principles of Distributed Computing (PODC), Toronto, Ontario, Canada, August 1988. However, any form of sequence numbering or other equivalent technique known to those skilled in the art can be used in this embodiment.

Similar techniques are also applicable for configurations with multiple data centers or with no data center. In an example in which there is no data center, the shares can be arranged in accordance with the following example:

```
//NewYork/shadow/Boston is a broadcast share of //Boston
//Boston/shadow/NewYork is a broadcast share of //NewYork
```

In the case of multiple data centers, one example of a correct and scalable configuration relates each local share to every data center and relates each remote location to every data center. For two example data centers dc1 and dc2, the configuration would be:

```
//Boston is a local share of //dc1/Boston
//Boston is a local share of //dc2/Boston
//NewYork is a local share of //dc1/NewYork
//NewYork is a local share of //dc2/NewYork
//Boston/shadow1/NewYork is a broadcast share of //dc1/NewYork
//Boston/shadow2/NewYork is a broadcast share of //dc2/NewYork
//NewYork/shadow1/Boston is a broadcast share of //dc1/Boston
//NewYork/shadow2/Boston is a broadcast share of //dc2/Boston
```

In this example, there are two data center locations; however, similar techniques are applicable for a larger number of locations. Each location has one local share mapped as described above, and one shadow share for each other location in the organization.

The above examples deal with a static allocation of files to shares, and shares to locations. However, similar techniques are applicable when files or shares move among locations. If elements move among locations, data structures must be maintained so as to determine where changes can be made or how to resolve conflicting changes. Embodiments can be pessimistic (preventing any conflicts) or optimistic (detecting and resolving conflicts). One simple pessimistic embodiment is for the multiple servers with copies of a file to have a master server determining who holds the master (modifiable) copy. The master server can be determined statically, or by dynamically passing a token among servers, or by an election among the servers, or by other well-known means of distributed coordination.

Figure 3:
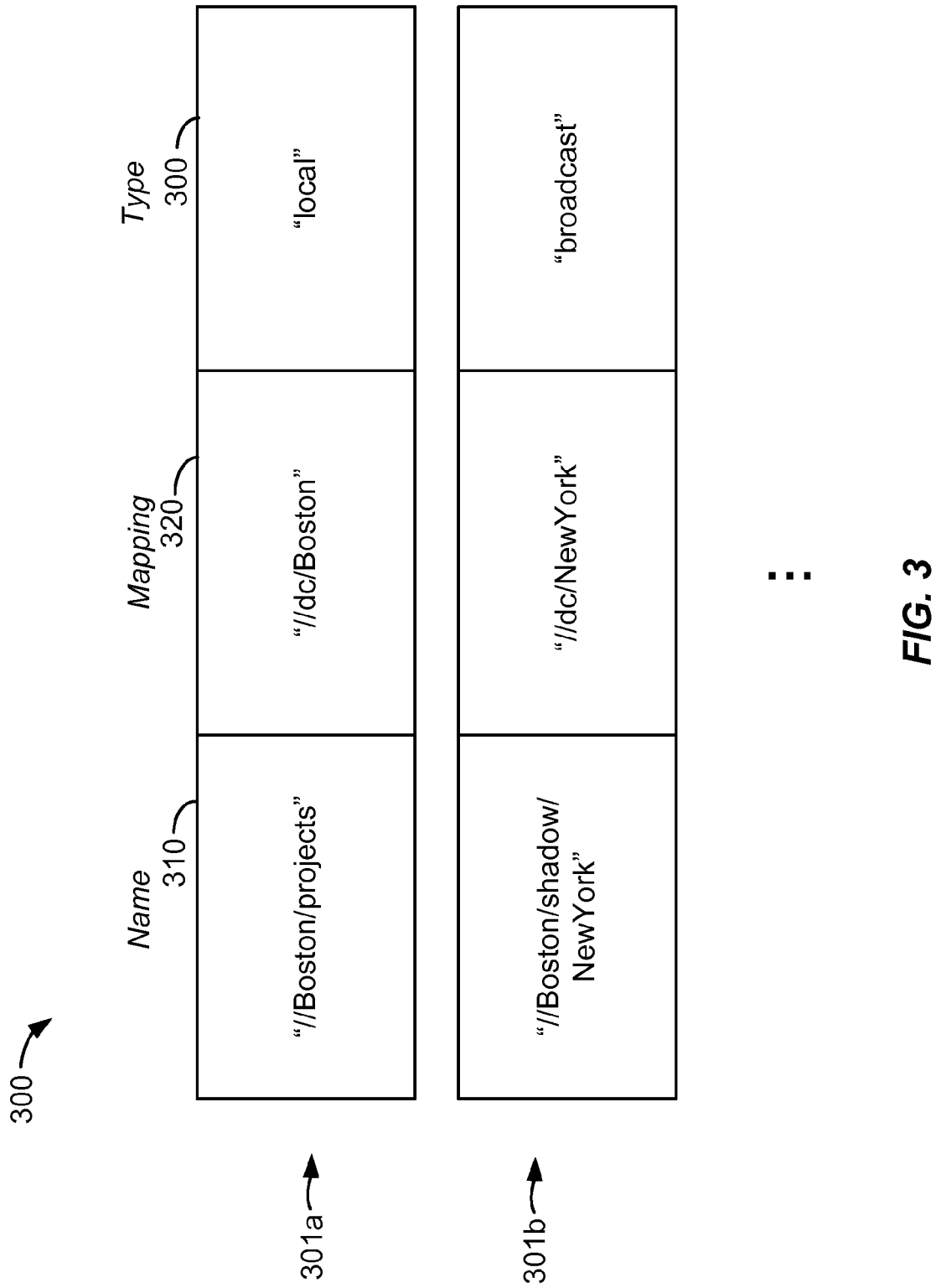
FIG. 3 shows an example server map suitable for use with an embodiment of the invention.

FIG. 3 shows a server map 300 capable of having a plurality of entries, including entries 301a and 301b shown in FIG. 3. Server map 300 can be utilized as a client-side server map 131 or a server-side server map 151, as discussed above, and implements the mappings such as those discussed in the above examples. Such a map could be used as input by the client-side discriminator 232 or server-side discriminator 252. In an embodiment, each entry 301 in such a map includes at least a name field 310, a mapping field 320, and a type field 330. Such a map may also have additional fields containing other information that is useful for the client-side discriminator 232 and/or server-side discriminator 252. For any specific entry, any or all of the field may be empty.

In an example illustrated by FIG. 3, the entries are shown such as they could be used for the client-side server in the Boston office in the previous example. Entry 301a represents a possible encoding of "//Boston/projects is a local share of //dc/Boston." Entry 301b represents a possible encoding of "//Boston/shadow/NewYork is a broadcast share of //dc/NewYork." Other styles of encoding can be useful, as explained further below.

The name field 310, if non-empty, contains a specification of one or more names or other distinguishing data that could be used by client 110 in its request 115a. Use of a matching name by client 110 in a request 115a triggers the application of the mapping or other behavior specified by the other parts of the entry. An empty name field 310 may be used to mark an entry as applicable to all requests, or for other situations where discrimination by name is not required, for example because a previous component has already discriminated by name.

In an embodiment, the mapping field 320, if non-empty, contains a specification of transformations or mappings to apply to the matching requests. In one embodiment, the mapping field 320 contains a specification of one or more servers to use, possibly including client-side server 180, instead of the original server(s) named in the request 115a. In an embodiment, the mapping field 320 contains a specification of one or more servers as previously described and additionally specifies priorities for choosing among the multiple servers. In another embodiment, the mapping field 320 contains a specification of one or more servers as previously described, and additionally specifies rules and/or computations for choosing among the multiple servers. In another embodiment, the mapping field 320 contains a substitute request that is intended to replace original request 115a. An empty mapping field 320 may be used when an entry 301 does not need any mapping or transformation, or when the mapping or transformation is being performed by some other component of the system unrelated to the server map 300.

In an embodiment, the type field 330, if non-empty, contains an indication of how the other fields in the entry 301 should be interpreted, or how the mappings in mapping field 320 should be applied. In one embodiment, the type field can take on values indicating "local" or "broadcast".

Figure 4A:
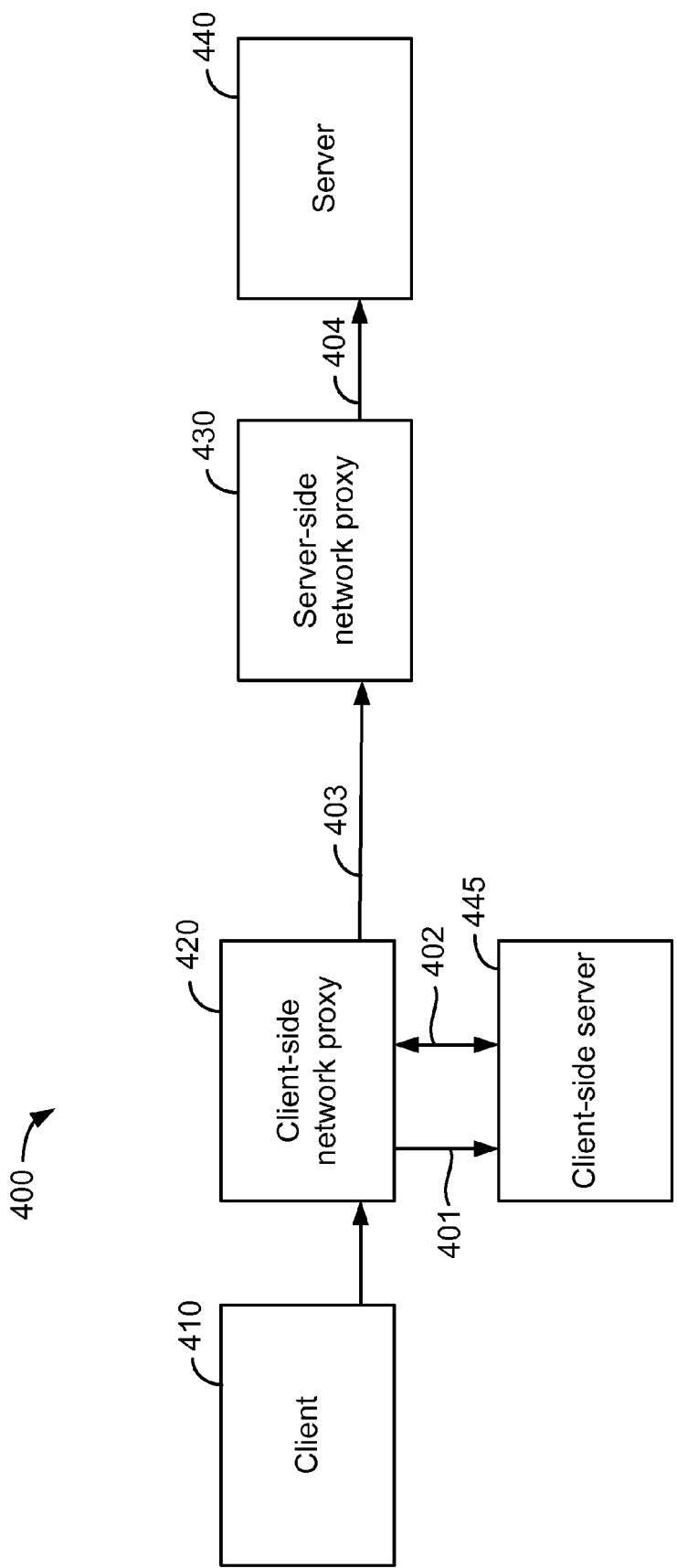
FIG. 4A shows an example synchronization between a client-side server and an origin server according to an embodiment of the invention.
Figure 4B:
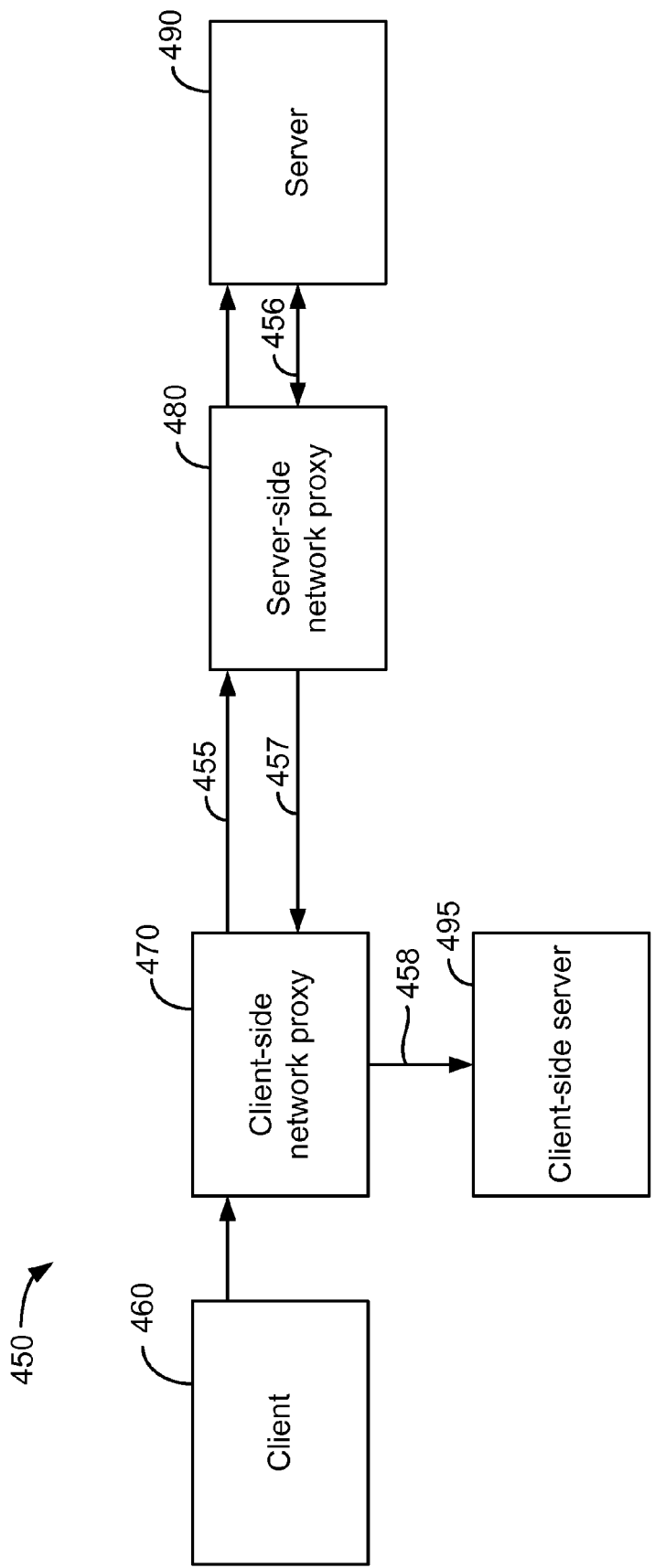
FIG. 4B shows an example synchronization between a client-side server and an origin server according to an embodiment of the invention.

FIGS. 4A-B show two examples of synchronization between a client-side server 450 and a server 440. FIG. 4A illustrates example 400 in which the client-side server 445 is the "master" and all changes made to data assigned to this server are propagated to the server 440. This could correspond to a share at client-side server 450 being marked as a "local" share of a share at server 440. A request 401 served by client-side server 445 may cause a change in the state of data maintained by client-side server 445. In an embodiment, that change in the state of data will be detected by the client-side network proxy 420 through some periodic or triggered exchange of information 402. In response to detecting a state change, the client-side network proxy 420 formulates the state change as a message 403 to the server-side network proxy 430. On receipt of the message 403, the server-side network proxy 430 updates the copy of the data of client side server 445 that is maintained by server 440. In cases where the server-side network proxy 430 cannot directly update the state of data on server 440, an embodiment of server-side network proxy 430 formulates one or more requests 404 to server 440 that will produce a state of data on server 440 matching that of client-side server 450.

In the example 450 of FIG. 4B, server 490 is the "master" and all changes made to data assigned to this server are propagated to the copies of the data at the client-side server 495. This could correspond to a share at client-side server 495 being marked as a "broadcast" share of a share at server 490. A request 455 handled by server 490 may cause a change in the state of data maintained by server 490. That change in the state of data on server 490 may be detected by the server-side network proxy 480, client-side network proxy 420, or client-side server 495 through some periodic or triggered exchange of information 456.

If the server-side network proxy 480 is the detecting element, it formulates the state change as a message 457 to the client-side network proxy 470. On receipt of such a message 457 or if it is the detecting element, the client-side network proxy 470 updates the state of data maintained by client-side server 495. In cases where the client-side network proxy 470 cannot directly update the state of data on the client-side server 495, client-side network proxy 470 formulates one or more requests 458 to client-side server 495 that will produce data on server 495 having a state matching that of server 490. If client-side server 495 is the detecting element, it updates its internal state to match the change detected at server 490.

Figure 5:
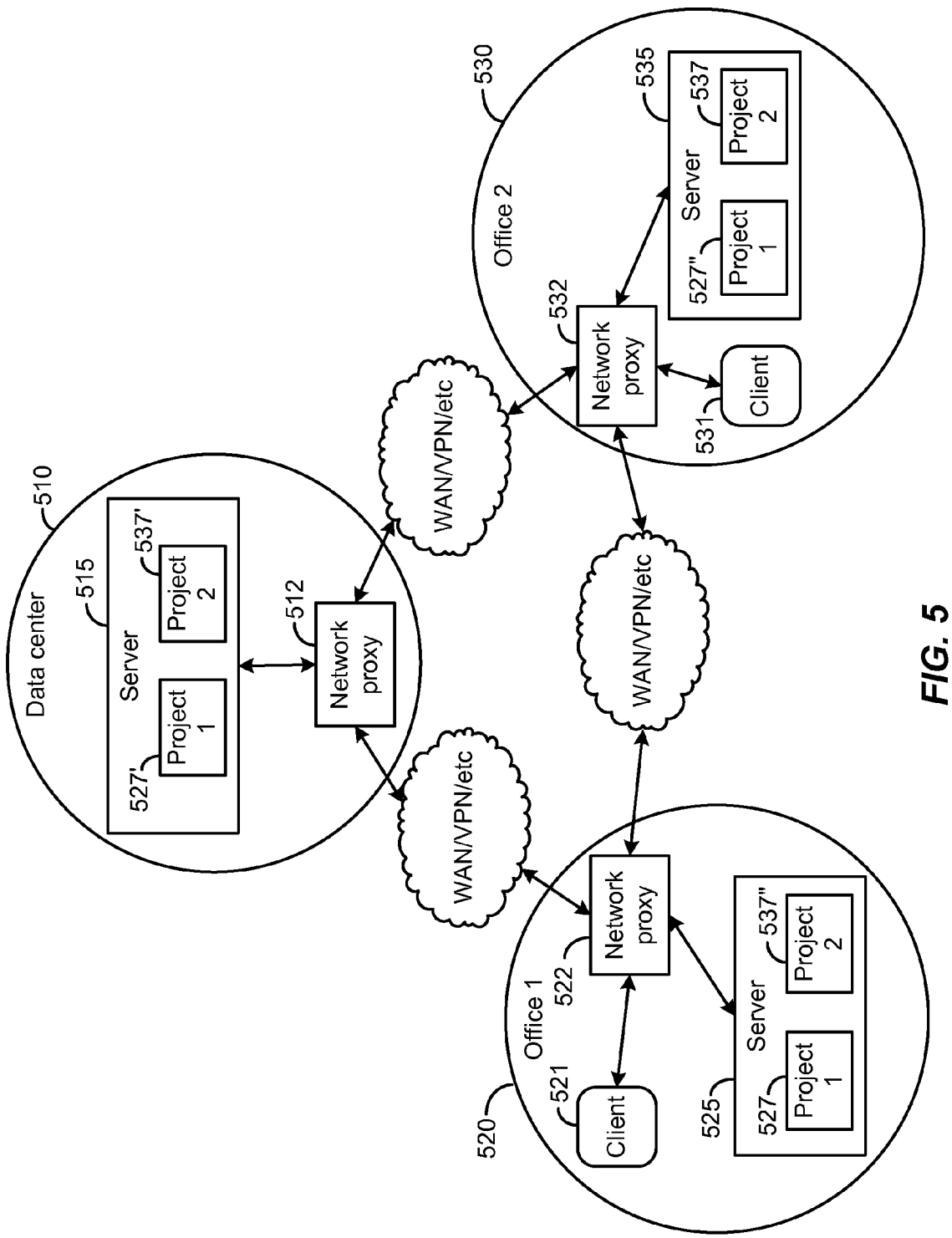
FIG. 5 shows operation of a multi-site system according to an embodiment of the invention.

FIG. 5 shows an example multi-site system. The figure shows a system including a data center 510 used only for backup (copying) data and two additional locations 520, 530 with a single assigned project each. From the following description, the extension of this example to systems including additional local sites and/or projects in any arbitrary configurations is obvious to one skilled in the art. Example sites 520 and 530 each have a corresponding example local client 521 and 531, respectively. Example sites 510, 520, and 530 each have corresponding network proxies 512, 522, and 532, respectively, and corresponding servers 515, 525, and 535, respectively.

Example projects 527 and 537 are each an object or group of objects handled by a server. Each project is assigned to a single local site. In this example, project 527 is assigned to site 520. This assignment means that project 527 is marked as "local" at server 525, "broadcast" at server 515 with an indicated source server corresponding to server 525, and "broadcast" at server 535 with an indicated source server corresponding to server 515. In this embodiment, a change can be made to project 527 only at server 525. These changes are then propagated to the copy of project 527 assigned to server 515, referred to as 527', and to the copy of project 527 assigned to server 535, referred to as 527".

Similarly, the assignment of example project 537 to site 530 means that project 537 is marked as "local" at server 535, "broadcast" at server 515 with an indicated source server corresponding to server 535, and "broadcast" at server 525 with an indicated source server corresponding to server 515. In this embodiment, a change can be made to project 537 only at server 535. These changes are then propagated to the copy of project 537 assigned to server 515, referred to as 537', and to the copy of the project 537 assigned to server 525, referred to as 537".

In an embodiment, when client 521 operates on project 527, client 521 may send its requests directly to server 525. In contrast, when client 521 operates on project 537, client 521 sends its requests via network proxy 522 and network proxy 532 to server 535. Similarly, when client 531 operates on project 537, client 531 sends its requests directly to server 535. Client 531 operates on project 527 by sending its requests via network proxy 532 and 522 to server 525. In embodiments of the invention, each client is operating on a local copy or has accelerated access to a remote copy via transaction-accelerator proxies.

In this example, each client acts only as a client, but all other elements, such as the network proxies, play either a client-side or server-side role depending on the location of the client sending the request. For example, when client 521 operates on project 537, network proxy 522 acts as a client-side network proxy, network proxy 532 acts as a server-side network proxy, and server 525 may act as a client-side server. But when client 531 operates on project 527, network proxy 522 acts as a server-side network proxy, network proxy 532 acts as a client-side network proxy, and as server 525 is the target of the request sent by client 531, server 535 that may act as a client-side server.

In the preceding example discussed with reference to FIG. 5, all networks and servers were fully functional, that is, there are no network impairments. The following discussion considers the operation of an embodiment of the invention in the presence of various kinds of network impairment. First, if site 520 has no connectivity to other sites, it is still possible for client 521 to operate on project 527 at server 525, and no adjustment to client 521 is required. It is also possible for client 521 to operate on the copy of project 537 stored as project 537" at server 525, but only by sending requests that do not change the state of project 537". In one embodiment, operating on project 537" instead of 537 requires client 521 to change where it is sending its requests so that they go directly to server 525 instead of through network proxy 522. In another embodiment, operating on project 537" instead of 537 does not require client 521 to change its sending of requests, with the redirection accomplished by network proxy 522 when it determines that it cannot communicate with its counterpart network proxy 532. In either embodiment, client 521 will be unable to issue requests that change the state of project 537" until the network impairment is eliminated.

Another kind of network impairment can occur when the data center 510 is not reachable or the data center server 515 has failed. In an embodiment, client 521 can still send requests via network proxies 522, 532 to change project 537 on server 535, but any such changes will not be reflected in project 537' on server 515. In one embodiment, which increases availability at the expense of consistency, if network proxies 522 and 532 determine that network proxy 512 is unable to accept the changes of project 537' on server 515, they arrange a new direct connection, so that changes to project 537 on server 535 are propagated directly to project 537" on server 525. This embodiment means that clients 521 and 531 can continue working unaffected by the network impairment, but the changes are not being captured at 537' in the data center and a subsequent step of resynchronizing will be required.

In another embodiment, which increases consistency at the expense of availability, if network proxies 522 and 532 determine that network proxy 512 is unable to accept the changes of project 537' on server 515, they act as though there is no connectivity between sites 520 and 530, simulating the previously-described network impairment in which a site has no network connectivity.

A third kind of network impairment occurs when a site, such as site 530, is not reachable or server, such as server 535, has failed. Clearly it is still possible for client 521 to operate on project 527 at server 525, and no adjustment to client 521 is required. It is also possible for client 521 to operate on the image of project 537 stored as project 537" at server 525, but only by sending requests that do not change the state of project 537". In one embodiment, operating on project 537" instead of 537 requires client 521 to change where it is sending its requests so that they go directly to server 525 instead of through network proxy 522. In another embodiment, operating on project 537" instead of 537 does not require client 521 to change its sending of requests, with the redirection accomplished by network proxy 522 when it determines that it cannot communicate with its counterpart network proxy 532. In either embodiment, client 521 will be unable to issue requests that change the state of project 537".

In the above examples, impairments were phrased in terms of effects on client 521. Similarly, when corresponding effects take place for client 531, which has access to always-available local project 537, it may need to adjust among using 527, 527', or 527" depending on the network impairments. In contrast, since there is no local project in data center 510 in this example, there is no opportunity for purely-local updating in data center 510 in the absence of communication with sites 520, 530.

An attribute of at least some of the above-described embodiments is that elements, such as network proxies, do not need to distinguish between server failure and network failure. They also do not need to deal with cases in which there is asymmetric connectivity, so that one side can speak to the other but that side cannot speak back. Instead, the communicating network proxies decide whether connectivity is "normal" or "impaired", with any deviation from normal connectivity treated by both sides as "impaired". In further embodiment, the communicating proxies minimize the length of time spent in which one side considers the link "normal" while the other considers it "impaired," which can be accomplished by a variety of means obvious to one skilled in the art.

Although the invention has been discussed with respect to specific embodiments thereof, these embodiments are merely illustrative, and not restrictive, of the invention. Further embodiments are described in the attached appendix. Furthermore, the system architecture discussed above is for the purposes of illustration. The invention can be implemented in numerous different forms including as a stand-alone application or as a module integrated with other applications. Thus, the scope of the invention is to be determined solely by the claims.

What is claimed is:

1. A distributed system comprising:
    a first network proxy adapted to interface with a first client and a first server, wherein the first server includes a first copy of data; and
    a second network proxy adapted to interface with the first network proxy and a second server, wherein the second server includes a second copy of the data;
    wherein the first network proxy includes logic adapted to receive a write request to modify the data from the first client, logic adapted to locate a primary copy of the data, logic adapted to respond to the write request by modifying the first copy of the data on the first server if the first copy is determined to be the primary copy of the data, and logic adapted to respond to the write request by forwarding the write request to the second network proxy if the second copy of the data is the primary copy, wherein the logic adapted to locate a primary copy of the data includes logic to access a server map specifying a relationship between a shared directory of the first server and a shared directory of the second server, and wherein the server map designates a shared directory including the primary copy of the data as a local directory and a shared directory including a non-primary copy of the data as a broadcast directory.

2. The distributed system of claim 1, wherein the first network proxy includes logic adapted to forward a data update request to the second network proxy following the modification of the first copy of the data.

3. The distributed system of claim 2, wherein the second network proxy includes logic adapted to receive a data update request from the first network proxy and to update the second copy of the data in response to the data update request.

4. The distributed system of claim 3, wherein the second network proxy includes logic adapted to receive a write request forwarded from the first network proxy and to respond to the write request by modifying the second copy of the data.

5. The distributed system of claim 4, wherein the second network proxy includes logic adapted to create and forward a data update request to the first network proxy following the modification of the second copy of the data.

6. The distributed system of claim 5, wherein the data update request includes at least a portion of the data modified by the write request.

7. The distributed system of claim 5, wherein the data update request includes at least one instruction adapted to be executed by an application such that the first copy of the data matches the second copy of the data.

8. The distributed system of claim 5, wherein the first network proxy includes logic adapted to receive the data update request from the second network proxy following the forwarding of the write request to the second network proxy and to respond to the data update request by modifying the first copy of the data.

9. The distributed system of claim 1, wherein the first network proxy includes logic adapted to determine the operational status of a network connection between the first and second network proxies, logic adapted to receive a read request for the data from the first client, logic adapted to respond to the read request by retrieving the second copy of the data from the second server via the second network proxy in response to a determination that the network connection is operational and that the second copy of the data is the primary copy, and logic adapted to respond to the read request by retrieving the first copy of the data from the first server in response to a determination that the network connection is not operational or that the first copy of the data is the primary copy.

10. The distributed system of claim 1, wherein the first server is a file server.

11. The distributed system of claim 1, wherein the first server is an e-mail server.

12. The distributed system of claim 1, wherein the first server is a multimedia server.

13. The distributed system of claim 1, wherein the first server is a database server.

14. A device adapted to improve the availability of data, the device comprising:

a first network proxy adapted to interface with a first client, a second network proxy, and a first server, wherein the first server includes a first copy of data in a first shared directory; and a server map specifying a relationship between the first shared directory and a second shared directory accessible to the second network proxy, wherein the server map designates a shared directory including a primary copy of the data as a local directory and a shared directory including a non-primary copy of the data as a broadcast directory;

wherein the first network proxy includes logic adapted to determine the operational status of a network connection between the first and second network proxies, logic adapted to receive a data access request for the first data, logic adapted to locate the primary copy of the data using the server map; logic adapted to forward the data access request to the second network proxy in response to a determination that the network connection is operational and a determination that the primary copy of the data is stored in the second shared directory; and logic adapted to provide a data access the first copy of the data on the first server in response to a determination that a determination that the network connection is not operational or that the primary copy of the data is stored in the first shared directory.

15. The device of claim 14, wherein the data access is a read-only access in response to a determination that the primary copy of the data is stored in the second shared directory and the data access is read and write access in response to a determination that the primary copy of the data is stored in the first shared directory.

16. The device of claim 14, wherein the first network proxy includes logic adapted to receive a data update request from the second network proxy following the forwarding of the data access request to the second network proxy and to respond to the data update request by modifying the first copy of the data.

17. The device of claim 16, wherein the logic adapted to respond to the data update request includes logic adapted to issue a second data access request including modified data to be incorporated with the data.

18. The device of claim 16, wherein the logic adapted to respond to the data update request includes logic adapted to issue a second data access request including at least one instruction adapted to be executed by an application to modify the data.

19. The device of claim 14, wherein the first network proxy is adapted to interface with the first client and the first server via a local area network and is adapted to interface with the second network proxy via a wide-area network.

20. The device of claim 14, wherein the first network proxy is incorporated with a network transaction accelerator.

21. The device of claim 14, wherein the first server is a file server.

22. The device of claim 14, wherein the first server is an e-mail server.

23. The device of claim 14, wherein the first server is a multimedia server.

24. The device of claim 14, wherein the first server is a database server.

25. The device of claim 14, wherein the first server is a web server.

* * * * *

UNITED STATES PATENT AND TRADEMARK OFFICE
CERTIFICATE OF CORRECTION

| | | |
|---|---|---|
| PATENT NO. | : 9,124,666 B2 | Page 1 of 1 |
| APPLICATION NO. | : 13/725926 | |
| DATED | : September 1, 2015 | |
| INVENTOR(S) | : Daniel Edwin Burman et al. | |

It is certified that error appears in the above-identified patent and that said Letters Patent is hereby corrected as shown below:

Title Page

In item 72 (Inventors), the name of the fifth named inventor which appears as "MArk Stuart Day, Milton MA" should read as follows:

--Mark Stuart Day, Milton MA--

On page 2, item 56 (References Cited) under the heading U.S. Patent Documents, please delete the words "Zhang et al." as they appear in the citation for U.S. Pat. No. 6,678,828 and replace with the words "Pham et al." so that the citation reads as follows:

--6,678,828 B1  1/2004   Pham et al.--

Signed and Sealed this
Twelfth Day of January, 2016

Michelle K. Lee
*Director of the United States Patent and Trademark Office*